Dec. 12, 1961 B. F. LATHAM, JR., ET AL 3,012,864
APPARATUS FOR MAKING CARBON BLACK
Filed Jan. 19, 1960 2 Sheets-Sheet 1
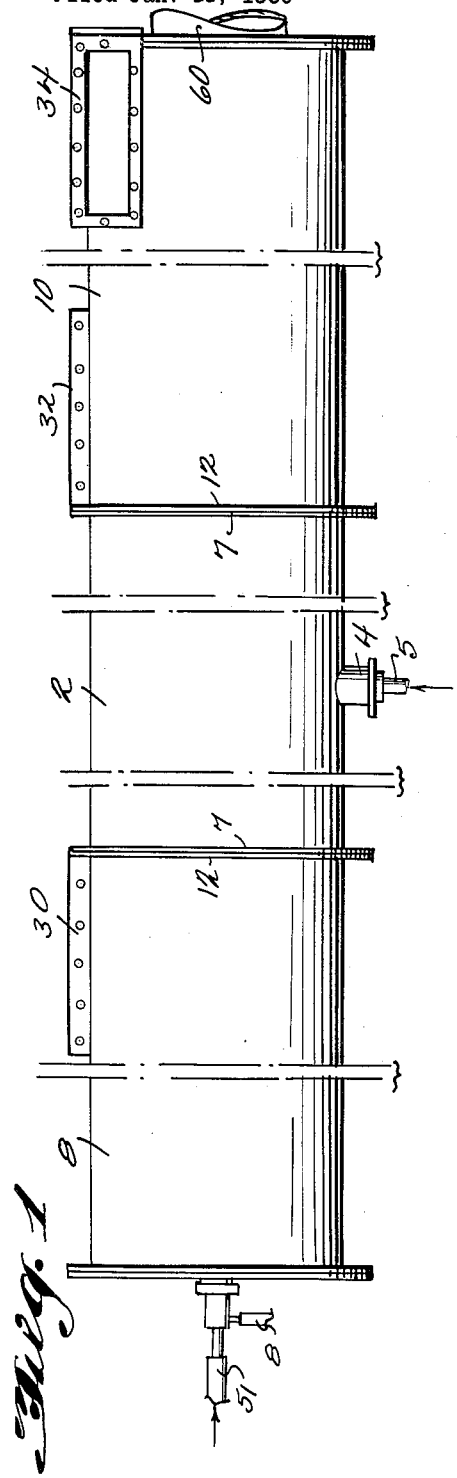
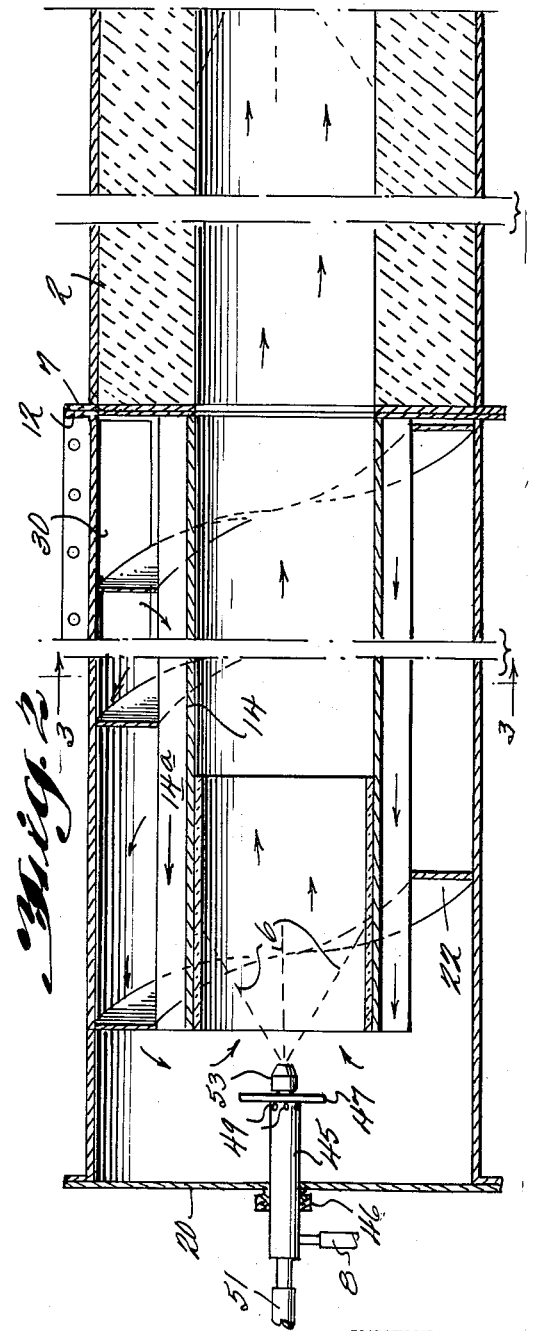
INVENTOR:
THEODORE A. RUBLE
BY BURTON F. LATHAM
ATTORNEY

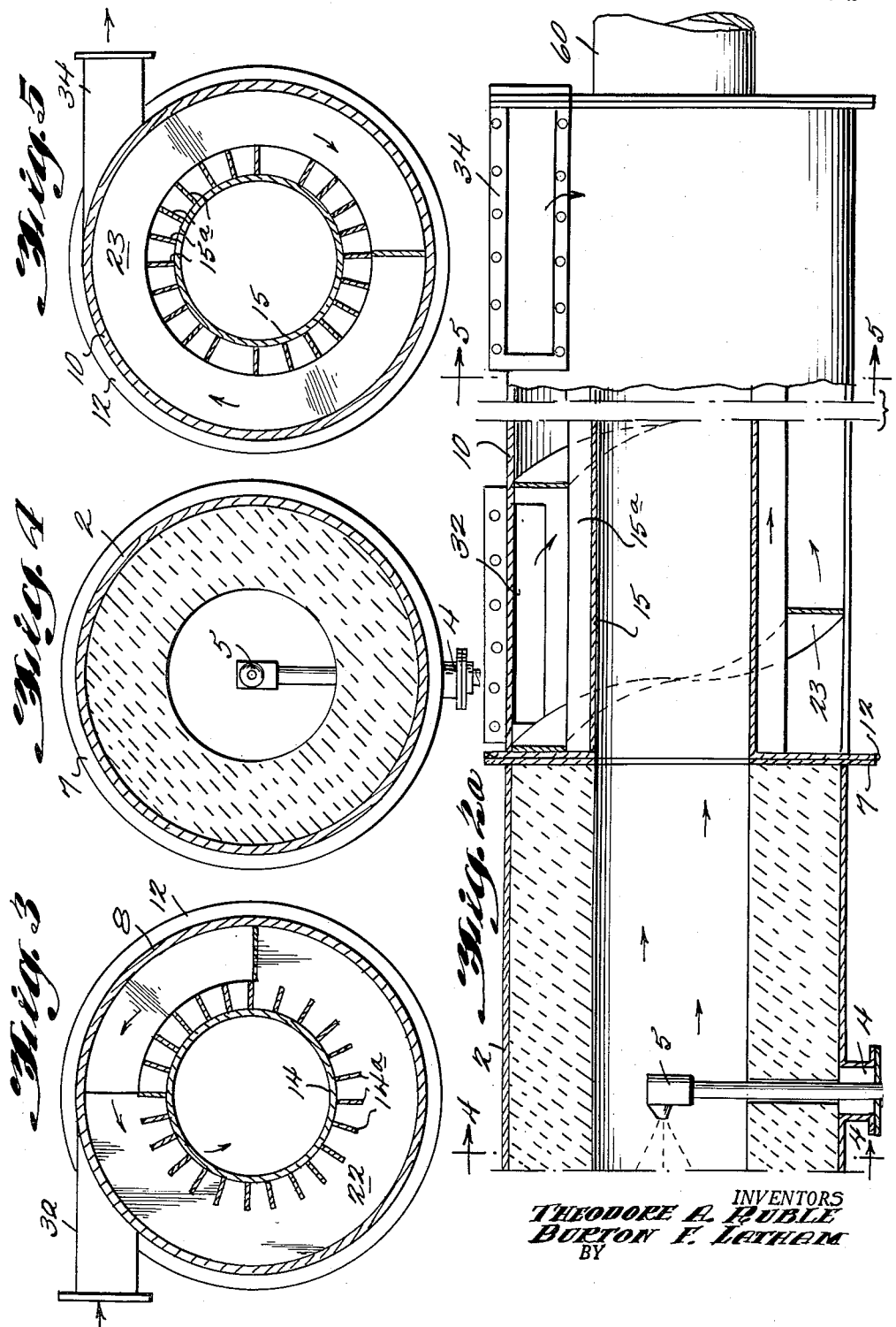

3,012,864
APPARATUS FOR MAKING CARBON BLACK
Burton F. Latham, Jr., and Theodore A. Ruble, Amarillo, Tex., assignors to Continental Carbon Company, Amarillo, Tex., a corporation of Delaware
Filed Jan. 19, 1960, Ser. No. 3,284
6 Claims. (Cl. 23—259.5)

This invention relates to the manufacture of carbon black from petroleum oils, or any type of hydrocarbon, such as shale oil, coal tar, etc.

It is, of course, generally known that a superior grade of carbon black is obtained by rapidly cracking a finely divided hydrocarbon at a relatively high temperature in a turbulent atmosphere wherein the rate of heat transfer to the hydrocarbon is very rapid. Also that, when preheated air is used, a higher yield is obtained due to the fact that a smaller portion of the hydrocarbon has to be burned in order to raise the heat of the gases and remaining hydrocarbon to cracking temperature. The velocity of the gas is very high, being in some instances above the speed of sound; and the high temperatures which are involved (particularly in the case of reactors for producing carbon black of small particle size) introduce many problems, some of which will be referred to hereinafter.

Frequently, the furnace or reactor is composed entirely of refractory material.

In certain pending patent applications, including our applications Serial No. 787,210, filed January 16, 1959, and No. 789,714, filed January 28, 1959, now Patent No. 2,976,128, the furnace or reactor takes the form of a metallic tube which is provided on its exterior with heat-exchange fins, the whole being encased in a metallic tubular air jacket.

According to the structures of the two patent applications specifically identified, cooling air enters the concentric space between the outer air jacket and the inner tube, i.e., "fintube," flowing in one of a number of flow patterns toward the front end of the reactor. Here the air turns and enters the inside of the fintube which forms the furnace or reactor and is there mixed with an excess of hydrocarbon which is partially burned; the remainder being cracked to hydrogen and carbon black; and the hot effluent gas generated flows toward the rear end of the reactor. The cooling jacketed air which flows between the air jacket and fintube becomes progressively hotter as it approaches the front end of the reactor. The maximum temperature inside the fintube is reached when the combustion reaction is complete, which, experiments prove, is approximately three feet away from the point of hydrocarbon introduction in a fintube of commercially operable size. The gas temperature inside the fintube drops off from this point on to the exit end of the fintube due to heat absorption by the hydrocarbon cracking action and heat transferred through the fintube to the cooling air within the air jacket. Thus, as the length of the fintube is increased, the preheat temperature of the air increases; and the peak temperature inside the fintube also increases due to the added preheat already present in the air used for combustion. It is, therefore, seen that the length of a fintube of any particular design is limited by the maximum operating temperature of the material of construction of said tube. High temperature stainless steel and Inconel alloys can stand continuous operating temperatures between 1900° to 2300° F., provided they are not subjected to high mechanical stress. With fintubes of the types disclosed in our patent applications Ser. Nos. 787,210 and 789,714 and of a length of approximately twenty feet, air preheat temperatures above 1000° F. have been reached, together with an estimated maximum temperature of close to 3500° F. within the fintube. Despite these facts, the fintube operates relatively cool (approximately 1400° F.) under 15/1 air-gas ratio (1080 B.t.u. natural gas) when no oil is being added to the reactor, and there is an excess of oxygen present. Under these conditions, there is a blue flame with very little energy being irradiated to the fintube, most of the heat being transferred by conduction through the gas film. When oil is added, there is a reducing flame with a large excess of hydrocarbon being added. Under these conditions, the carbon black particles formed radiate heat directly to the wall causing the maximum temperature of the tube to increase to above 1900° F.

Accordingly, the longer the fintube, the hotter it becomes at the maximum temperature point.

Thus, there is a limit to the length of the fintube and the preheat temperature to which the jacketed air can be heated.

As the fintube length is increased:

(1) Yield increases due to air preheat.
(2) Yield increases due to longer craking reaction time.
(3) Production rate increases due to higher oil feed rates that are possible.
(4) Fintube is subjected to higher temperatures.

It will be noted that with the increase of the fintube length, although the higher oil feed rates possibly tend to lower reaction temperature somewhat, this is more than offset by the added air preheat and actually results in higher fintube temperatures.

Therefore, a way is needed to limit the preheat temperature of the air and still obtain the longer reaction time that will permit the higher oil feed rate. To a certain extent, this can be done by limiting the heat transferred by coating the interior surface of the tube with a high temperature flame spray coating, such as aluminum oxide or zirconium oxide as disclosed in the aforementioned patent application Serial No. 787,210, or by installing a pre-cast refractory liner as has heretofore been proposed.

It is among the objects of the present invention to provide an improved method and apparatus for making carbon black of high quality at a materially reduced cost.

Another object is the provision of an apparatus for attaining the foregoing objectives which is easy to control and which is comparatively simple and inexpensive to install, operate and maintain.

More specifically, the teachings of the present invention contemplate a cylindrical furnace, or reactor, of which only a relatively small and intermediate portion is made of refractory material, the remainder thereof being constructed of metal and provided with air cooling means.

The invention, then, comprises the features hereinafter fully described and as particularly pointed out in the claims, the following description and the annexed drawings setting forth in detail certain illustrative embodiments of the invention, these being indicative of some of several ways in which the principles of the invention may be employed.

In said drawings:

FIGURE 1 is a side elevational view of a form of apparatus which is contemplated by the teachings of the present invention;

FIGURE 2 is an elevational view, partly in section, of a portion of the apparatus of FIGURE 1 and on an enlarged scale;

FIGURE 2a is a continuation of FIGURE 2 and illustrates the remainder of the apparatus of FIGURE 1;

FIGURE 3 is a transverse sectional view on the line 3—3 of FIGURE 2; and

FIGURES 4 and 5 are transverse sectional views on the lines 4—4 and 5—5, respectively, of FIGURE 2a.

Referring more particularly to the drawings, the numeral 2 designates a cylindrical refractory housing which comprises the chamber within which the reaction takes place, the same being provided with a spray port 4 containing a spray nozzle 5 which delivers a fine water spray 6 which is directed concurrently of the oil being cracked to carbon black and hydrogen.

The cylindrical refractory housing 2 may be provided with a metallic jacket extending throughout its length, or with a metallic ring at each end; in either case there being provided an annular flange 7.

Disposed at the front and rear ends of the cylindrical refractory housing 2 is a cylindrical metallic shell, as shown at 8 and 10, respectively. The inner end of each of the cylindrical metallic shells 8 and 10 is provided with an annular flange 12 which is bolted to the annular flanges 7 at the ends of the cylindrical refractory housing 2.

Disposed within each of the cylindrical metallic shells 8 and 10 is a metallic tube 14, the inside diameter of which is the same size as the bore of the cylindrical refractory housing 2 and is in alignment therewith.

As a specific example, the forward cylindrical metallic shell 8 and the rearward cylindrical metallic shell 10 may each take the form of standard eighteen-inch (inside diameter) steel pipes with the concentrically disposed inner metallic tubes 14 and 15 being eight inches in inside diameter. Each of the inner metallic tubes 14—15 is provided with longitudinally extending cooling fins 14a and 15a, respectively, which may, for example, be 1¾ inches in radial dimension and constitute ninety-six (96) in number.

In FIGURE 1, the left-hand end of the inner metallic tube 14 is shown as terminating short of the adjacent end wall 20 of the outer cylindrical metallic shell 8, thereby providing an unobstructed cylindrical chamber, the purpose of which will later appear.

Disposed between the outer diametrical edges of the longitudinally extending cooling fins 14a and 15a and the inner walls of the outer cylindrical metallic shells 8 and 10 is a metallic helicoid strip, as shown at 22 and 23, respectively. The inner edges of the helicoid strips 22 and 23 are welded at appropriate intervals to the radially outer edges of the longitudinally extending cooling fins 14a and 15a respectively, but need not be secured in any way to the inner surfaces of the outer metallic shells 8 and 10. Thus, the metallic helicoid strips 22 and 24 assist in supporting the longitudinally finned inner metallic tubes 14 and 15 concentrically within the outer cylindrical metallic shells 8 and 10 and in alignment with the bore of the cylindrical refractory housing 2.

The outer cylindrical metallic shells 8 and 10 are provided adjacent their inner ends with a tangential air inlet, as shown at 30 and 32, respectively; and each of these may acceptably take the form of a rectangular three-inch by twelve-inch slot.

The outer cylindrical metallic shell 10 is provided with a tangential air outlet 34 which may be of the same size and shape as the aforementioned air inlets 30 and 32.

From the foregoing construction and arrangement, it will be understood that the cylindrical refractory housing 2 will reach and maintain a fairly high ("soaking") temperature, while the inner metallic tubes 14 and 15 at the ends of said housing are air-cooled, tube 14 countercurrently, and tube 15 in the direction of flow as the reaction proceeds.

As air enters the tangential air inlet 30 of the cylindrical shell 8, a helical movement is imparted to it by the helical passageway defined by the helicoid strip 22, the latter helping to keep most of the air in helical turning motion around the longitudinally extending cooling fins 14a, while a small portion of the air passes between and along the said fins. The helical motion of the air traveling over the sharp edges of the fins at high velocity causes highly turbulent flow, tending to reduce the air film thickness and increasing the heat transfer from the fins.

The aforementioned combustion air, after passing the length of the helicoid passageway, turns and enters the outer end of the metallic tube 14, passing therethrough and into the combustion zone which is just inside the inlet end of the forward inner metallic tube 14. It is here that the combustion gas and carbon producing oil are introduced and where combustion starts.

As illustrated in FIGURES 1 and 2, the fuel gas is supplied to the combustion zone of the furnace or reactor by a pipe 45 which extends through a packing gland 46 and the center of the end wall 20 of the outer metallic shell 8 and into the adjacent unobstructed cylindrical chamber of the latter. However, the pipe 45 terminates short of the adjacent end of the inner metallic tube 14.

A flame holder disk 47 is secured to, and carried by, the inner end of the fuel gas supply pipe 45, the latter being provided with radially extending fuel gas discharge apertures 49 which are disposed adjacent the rearward surface of said disk.

The oil supply pipe is indicated at 51 and shown as disposed axially within the fuel gas supply pipe 45, and extending through the center of the flame holder disk 47, and terminating in a spray nozzle 53 which is positioned closely adjacent to the said flame holder disk.

The air entering through the air inlet 8 mixes with the fuel gas which is supplied by the fuel gas pipe 45 and is discharged therefrom through the peripheral discharge apertures 49 which are located immediately behind the flame holder disk 47. The gas passes around the flame holder disk along with the air; and a uniform mixture is obtained by means of the turbulent flow. The spray nozzle 53, which is mounted on the inner end of the oil pipe 51, and immediately in front of the flame holder disk 47, atomizes the liquid hydrocarbon and introduces the fine droplets into the base of the flame at the point where the combustion starts.

The flame holder, comprising the flame holder disk 47 and its associated instrumentalities, produces a uniform mixture of fuel gas and air by passing this mixture through a restriction which, in turn, produces a high degree of turbulence and also results in a swirling higher turbulent flame upon ignition.

If vaporized hydrocarbon is used, the spray nozzle 53 may be removed and an open-end pipe substituted therefor.

In either case, the oil is cracked to carbon black and hydrogen which are carried along with the effluent gases through the bore of the cylindrical refractory housing 2, heating the incoming combustion air and, in the process, becoming cooled. Quench water is introduced through the spray 4 into the gas stream immediately after the effluent gas leaves the first heat exchanger and enters the refractory housing 2 and is atomized into a fine spray, and commences to evaporate. The cooling of the effluent gas continues as it passes through the rearward inner metallic tube 15 to a sufficiently low temperature to enable it to be subsequently handled in a carbon collecting system which may be entirely conventional in design.

As previously stated, at the front end of the inner metallic tube 14, the jacket air turns and enters therein. The combustion gas and feedstock oil are introduced at this point by flame holder disk 47 and oil spray nozzle 53. The gas and part of the oil first burn to generate enough heat to crack the remaining oil. The hot effluent gases and the cracking action continue through the inner metallic tube 14 and into the bore of the cylindrical refractory housing 2 until they are quenched by the water spray 6 or cooled in the second heat exchange section which includes the inner metallic tube 15. The cooler effluent gases pass through the inner metallic tube 15, giving up additional heat and leaving the carbon reactor through a duct 60 connected with the carbon black collecting system. Additional cooling air is added through the tangential inlet 32 to the concentric space between the outer metallic shell 10 and the inner metallic tube 15. This air circulates helically along the helicoid strip 24 and around and between the fins 15a and becomes heated. The hot air leaves via the tangential outlet 34 and is utilized for process heat as described hereinbefore.

The length of the first section of the reactor which includes the inner metallic tube 14 is limited so the air preheat temperature does not become excessive. As shown, the second section which is defined by the cylindrical refractory housing does not have an air jacket and acts as a soaking chamber to obtain longer cracking time, and thus secure higher oil feed rates and larger yields. One or more quench sprays 6 may be used at the outlet end of this refractory section. The third section which includes the inner metallic tube 15 is a heat exchanger that cools the hot gas by heat exchange air cooling thus limiting or eliminating the amount of quench water necessary, and also doubling as a source of process heat to dry wet pelletized carbon black, and to preheat the oil feed to the reactor. Some added advantages of heat exchange cooling are:

(1) It lowers the volume of gases handled by the carbon black collecting system.
(2) It increases the carbon black concentration in the gas stream causing it to agglomerate to a higher degree and thus a large percent of the black can be caught in the cyclone collectors.
(3) It greatly lowers the dew point of the gases, thus helps to eliminate corrosion due to condensation of water vapor in the collecting system especially during start-up and shut-down periods.

While we have shown and described certain specific embodiments of the present invention, it will be readily understood that we do not wish to be limited exactly thereto, since various modifications may be made without departing from the scope of the invention as defined in the appended claims.

We claim:
1. In an apparatus for making carbon black, a metallic tubular housing, a second metallic tubular housing disposed in spaced relationship with respect to said first-named metallic tubular housing and in axial alignment therewith, a refractory tubular housing disposed between, and communicating with, said metallic tubular housings, an air jacket for said first-named metallic tubular housing, a separate air jacket for said second-named metallic tubular housing, the outer end of said first-named air jacket extending beyond the corresponding end of said first-named metallic tubular housing and providing an unobstructed chamber therein, a gas burner disposed in said unobstructed chamber and in axial alignment with all of said tubular housings, means for supplying liquid hydrocarbon to the flame produced by said gas burner, means for directing air from the inner end of said first-named air jacket toward the outer end thereof and accordingly into said unobstructed chamber, and means for directing air through said second-named air jacket.

2. In an apparatus for making carbon black, a metallic tubular housing, a second metallic tubular housing disposed in spaced relationship with respect to said first-named metallic tubular housing and in axial alignment therewith, a refractory tubular housing disposed between, and communicating with, said metallic tubular housings, an air jacket for said first-named tubular housing, a separate air jacket for said second-named metallic tubular housing, the outer end of said first-named air jacket extending beyond the corresponding end of said first-named metallic tubular housing and providing an unobstructed chamber therein, a gas burner disposed in said unobstructed chamber and in axial alignment with all of said tubular housings, means for supplying liquid hydrocarbon to the flame produced by said gas burner, means for directing air helically through said first-named air jacket from the inner end thereof toward the outer end and accordingly into said unobstructed chamber, and means for directing air through said second-named air jacket.

3. In an apparatus for making carbon black, a metallic tubular housing, a second metallic tubular housing disposed in spaced relationship with respect to said first-named metallic tubular housing and in axial alignment therewith, a refractory tubular housing disposed between, and communicating with, said metallic tubular housings, an air jacket for said first-named metallic tubular housing, a separate air jacket for said second-named metallic tubular housing, the outer end of said first-named air jacket extending beyond the corresponding end of said first-named metallic tubular housing and providing an unobstructed chamber therein, a gas burner disposed in said unobstructed chamber and in axial alignment with all of said tubular housings, means for supplying liquid hydrocarbon to the flame produced by said gas burner, means for directing air helically and longitudinally through said first-named air jacket from the inner end toward the outer end and accordingly into said unobstructed chamber, and means for directing air through said second-named air jacket.

4. In an apparatus for making carbon black, a metallic tubular housing, a second metallic tubular housing disposed in spaced relationship with respect to said first-named metallic tubular housing and in axial alignment therewith, a refractory tubular housing disposed between, and communicating with, said metallic tubular housings, an air jacket for said first-named metallic tubular housing, a separate air jacket for said second-named metallic tubular housing, the outer end of said first-named air jacket extending beyond the corresponding end of said first-named metallic tubular housing and providing an unobstructed chamber therein, a gas burner disposed in said unobstructed chamber and in axial alignment with all of said tubular housings, means for supplying liquid hydrocarbon to the flame produced by said gas burner, means for directing air from the inner end of said first-named air jacket toward the outer end thereof and accordingly into said unobstructed chamber, and means for directing air through said second-named air jacket in the opposite direction.

5. In an apparatus for making carbon black, a metallic tubular housing, a second metallic tubular housing disposed in space relationship with respect to said first-named metallic tubular housing and in axial alignment therewith, a refractory tubular housing disposed between, and communicating with, said metallic tubular housings, an air jacket for said first-named metallic tubular housing, a separate air jacket for said second-named metallic tubular housing, the outer end of said first-named air jacket extending beyond the corresponding end of said first-named metallic tubular housing and providing an unobstructed chamber therein, a gas burner disposed in said unobstructed chamber and in axial alignment with all of said tubular housings, means for supplying liquid hydrocarbon to the flame produced by said gas burner, means for directing air from the inner end of said first-named air jacket toward the outer end thereof and accordingly into said unobstructed chamber, and means for helically directing air through said second-named air jacket in the opposite direction.

6. In an apparatus for making carbon black, a metallic tubular housing, a second metallic tubular housing disposed in spaced relationship with respect to said first-named metallic tubular housing and in axial alignment therewith, a refractory tubular housing disposed between, and communicating with, said metallic tubular housings, an air jacket for said first-named metallic tubular housing, a separate air jacket for said second-named metallic tubular housing, the outer end of said first-named air jacket extending beyond the corresponding end of said first-named metallic tubular housing and providing an unobstructed chamber therein, a gas burner disposed in said unobstructed chamber and in axial alignment with all of said tubular housings, means for supplying liquid hydrocarbon to the flame produced by said gas burner, means for directing air from the inner end of said first-named air jacket toward the outer end thereof and accordingly into said unobstructed chamber, and means for helically and longitudinally directing air through said second-named air jacket in the opposite direction.

References Cited in the file of this patent

UNITED STATES PATENTS

| | | |
|---|---|---|
| 2,498,444 | Orr | Feb. 21, 1950 |
| 2,785,054 | Bethea et al. | Mar. 12, 1957 |
| 2,852,345 | Rushford | Sept. 16, 1958 |
| 2,924,512 | Webster et al. | Feb. 9, 1960 |

FOREIGN PATENTS

| | | |
|---|---|---|
| 547,324 | Canada | Oct. 8, 1957 |